(12) United States Patent
Park

(10) Patent No.: US 8,731,584 B2
(45) Date of Patent: May 20, 2014

(54) MOBILE TERMINAL AND METHOD FOR CONTROLLING THE MOBILE TERMINAL

(75) Inventor: Kyunglang Park, Seoul (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/291,425

(22) Filed: Nov. 8, 2011

(65) Prior Publication Data

US 2012/0142379 A1      Jun. 7, 2012

(30) Foreign Application Priority Data

Dec. 2, 2010  (KR) .......................... 10-2010-0121821

(51) Int. Cl.
*H04W 24/00*   (2009.01)
*H04M 1/66*    (2006.01)

(52) U.S. Cl.
USPC ........................................ 455/456.3; 455/411

(58) Field of Classification Search
USPC .................. 455/456.1–456.6, 410–411, 41.2, 455/418–420, 414.1; 370/328, 338
See application file for complete search history.

(56) References Cited

U.S. PATENT DOCUMENTS

| | | | |
|---|---|---|---|
| 8,099,526 B2 * | 1/2012 | Griffin et al. | 710/14 |
| 8,433,336 B2 * | 4/2013 | Lee et al. | 455/456.1 |
| 2002/0028674 A1 | 3/2002 | Slettengren et al. | |
| 2005/0130680 A1 | 6/2005 | Northcutt | |
| 2007/0275706 A1 * | 11/2007 | Furuichi | 455/414.2 |
| 2009/0160778 A1 * | 6/2009 | Nurmi et al. | 345/173 |
| 2009/0197617 A1 | 8/2009 | Jayanthi | |
| 2010/0048223 A1 | 2/2010 | Wei | |

* cited by examiner

*Primary Examiner* — Brandon Miller
(74) *Attorney, Agent, or Firm* — Lee, Hong, Degerman, Kang & Waimey

(57) ABSTRACT

A mobile terminal includes a position location module, a wireless communication unit, a user input unit, and a controller. The controller is configured to obtain first position information via the position location module in response to a first command received via the user input unit, receive second position information via the wireless communication unit, wherein the second position information relates to a geographical location of the external device, identify a relative distance between the mobile terminal and the external device using the first position information and the second position information, and perform an interlock function at the mobile terminal in response to a second command received via the user input unit if the relative distance between the mobile terminal and the external device is less than a threshold distance, where the interlock function restricts the mobile terminal from performing a function.

23 Claims, 23 Drawing Sheets

MOBILE TERMINAL AND METHOD FOR CONTROLLING THE MOBILE TERMINAL

CROSS-REFERENCE TO RELATED APPLICATIONS

Pursuant to 35 U.S.C. §119(a), this application claims the benefit of earlier filing date and right of priority to Korean Patent Application No. 10-2010-0121821, filed on Dec. 2, 2010, the contents of which are hereby incorporated by reference herein in their entirety.

FIELD OF THE INVENTION

The present invention relates to a mobile terminal, and more particularly, to a mobile terminal and a method for controlling the mobile terminal.

DESCRIPTION OF THE RELATED ART

Generally, terminals can be classified into mobile or portable terminals and stationary terminals. Furthermore, the mobile terminals can be classified as handheld terminals and vehicle mount terminals according to whether users can carry the terminals on their person.

As the functions of such terminals are diversified, the terminals are implemented as multimedia players equipped with composite functions, such as capturing photos or moving images, playing back music or video files, game play, and receiving broadcasts. To support and increase the functions of such terminals, improvements to the structural parts and/or software parts of the terminals may be considered.

The recent advent of diverse mobile terminals equipped with various functions has made it common for users to own a number of such diverse mobile terminals. As the storage capabilities of mobile terminals continue to increase, the need for protecting private information stored on the mobile terminals and the demand for more efficient and safer security functions also continue to increase.

The general security features provided by mobile terminals typically require an action to be performed on the mobile terminal, such that the action is configured to activate or cancel a security function. If the security function is activated, limited user commands can be executed. For example, the action can include inputting a password, number, character or a combination thereof using numerals or a drag input that is performed using a pattern of a specific trace.

Although mobile terminals provide general security features involving the use of a password to activate a lock function, the level of security provided by such security features is relatively low. Moreover, it is inconvenient for a user of the mobile terminal to memorize and input a password to the mobile terminal.

SUMMARY

According to one embodiment, a mobile terminal includes a position location module configured to obtain position information related to a geographical location of the mobile terminal, a wireless communication unit configured to permit wireless communication with an external device, a user input unit configured to receive user input, and a controller. The controller is configured to obtain first position information via the position location module in response to a first command received via the user input unit, receive second position information via the wireless communication unit, wherein the second position information relates to a geographical location of the external device, identify a relative distance between the mobile terminal and the external device using the first position information and the second position information, and perform an interlock function at the mobile terminal in response to a second command received via the user input unit if the relative distance between the mobile terminal and the external device is less than a threshold distance, where the interlock function restricts the mobile terminal from performing a function.

According to another embodiment, a mobile terminal includes a position location module configured to obtain position information related to a first geographical location of the mobile terminal, a wireless communication unit configured to permit wireless communication with an external device, a user input unit configured to receive user input, and a controller. The controller is configured to obtain first position information via the position location module after the interlock function of the mobile terminal has been set and if a first command for canceling the interlock function is received, wherein the interlock function restricts the mobile terminal from performing a function, receive second position information of an external device, wherein the second position information relates to a geographical location of the external device, identify a first relative distance between the mobile terminal and the external device using the first position information and the second position information, and disable the interlock function in response to a second command received via the user input unit if the first relative distance between the mobile terminal and the external device is less than a first threshold distance.

According to another embodiment, a method for controlling a mobile terminal includes obtaining first position information related to a geographical location of the mobile terminal via a position location module in response to a first command received via a user input unit, receiving second position information via a wireless communication unit, wherein the second position information relates to a geographical location of the external device, calculating a first relative distance between the mobile terminal and the external device using the first position information and the second position information, and setting an interlock function at the mobile terminal in response to a second command received via the user input unit if the relative distance between the mobile terminal and the external device is less than a threshold distance, where the interlock function restricts the mobile terminal from performing a function.

According to another embodiment, a method for controlling a mobile terminal includes setting an interlock function that restricts the mobile terminal from performing a function, receiving a first command for disabling the interlock function via a user input unit, obtaining first position information related to a first geographical location of the mobile terminal via a position location module, receiving second position information via a wireless communication unit, where the second position information relates to a geographical location of the external device, calculating a first relative distance between the mobile terminal and the external device using the first position information and the second position information, and disabling the interlock function in response to a second command received via the user input unit if the first relative distance between the mobile terminal and the external device is less than a first threshold distance.

According to another embodiment, a method for controlling a mobile terminal includes searching for at least one external device, selecting a specific external device from the at least one external device, requesting that the specific external device set an interlock function that restricts the mobile terminal from performing at least a partial command received via a user input unit, receiving a lock signal from the specific external device, and setting the interlock function in accordance with the lock signal.

According to another embodiment, a method for controlling a mobile terminal includes setting an interlock function that restricts at least a partial command received via a user input unit in accordance with a lock signal received from a specific external device, receiving an unlock signal from the specific external device, determining whether the unlock signal matches the lock signal, and disabling the interlock function when the unlock signal matches the lock signal.

According to another embodiment, a mobile terminal includes a position location module configured to obtain position information related to a geographical location of the mobile terminal, a wireless communication unit configured to permit wireless communication with an external device, a user input unit configured to receive user input, and a controller. The controller is configured to display an icon for enabling or disabling an interlock function that restricts the mobile terminal from performing a function, receive a touch input performed on the icon via a touch screen display, obtain first position information via the position location module in response to a first command received via the user input unit, receive second position information via the wireless communication unit, wherein the second position information relates to a geographical location of the external device, display at least the first position information or the second position information via the touch screen display, and enable or disable the interlock function in response to a second command received via the user input unit if a relative distance between the mobile terminal and the external device is less than a threshold distance.

According to another embodiment, a method for controlling a mobile terminal includes displaying an icon for enabling or disabling an interlock function that restricts the mobile terminal from performing a function, receiving a touch input performed on the icon via a touch screen display, obtaining first position information via the position location module in response to a first command received via the user input unit, receiving second position information via the wireless communication unit, wherein the second position information relates to a geographical location of the external device, displaying at least the first position information or the second position information via the touch screen display, and enabling or disabling the interlock function in response to a second command received via the user input unit if a relative distance between the mobile terminal and the external device is less than a threshold distance.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. The aspects, features, and advantages of the present invention will become more apparent upon consideration of the following description of preferred embodiments, taken in conjunction with the accompanying drawing figures. In the drawings.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the various embodiments will be described with respect to a mobile terminal 100 shown in FIGS. 1 through 3. However, it should be understood that such techniques can also be applied to other types of terminals.

Figure 1:
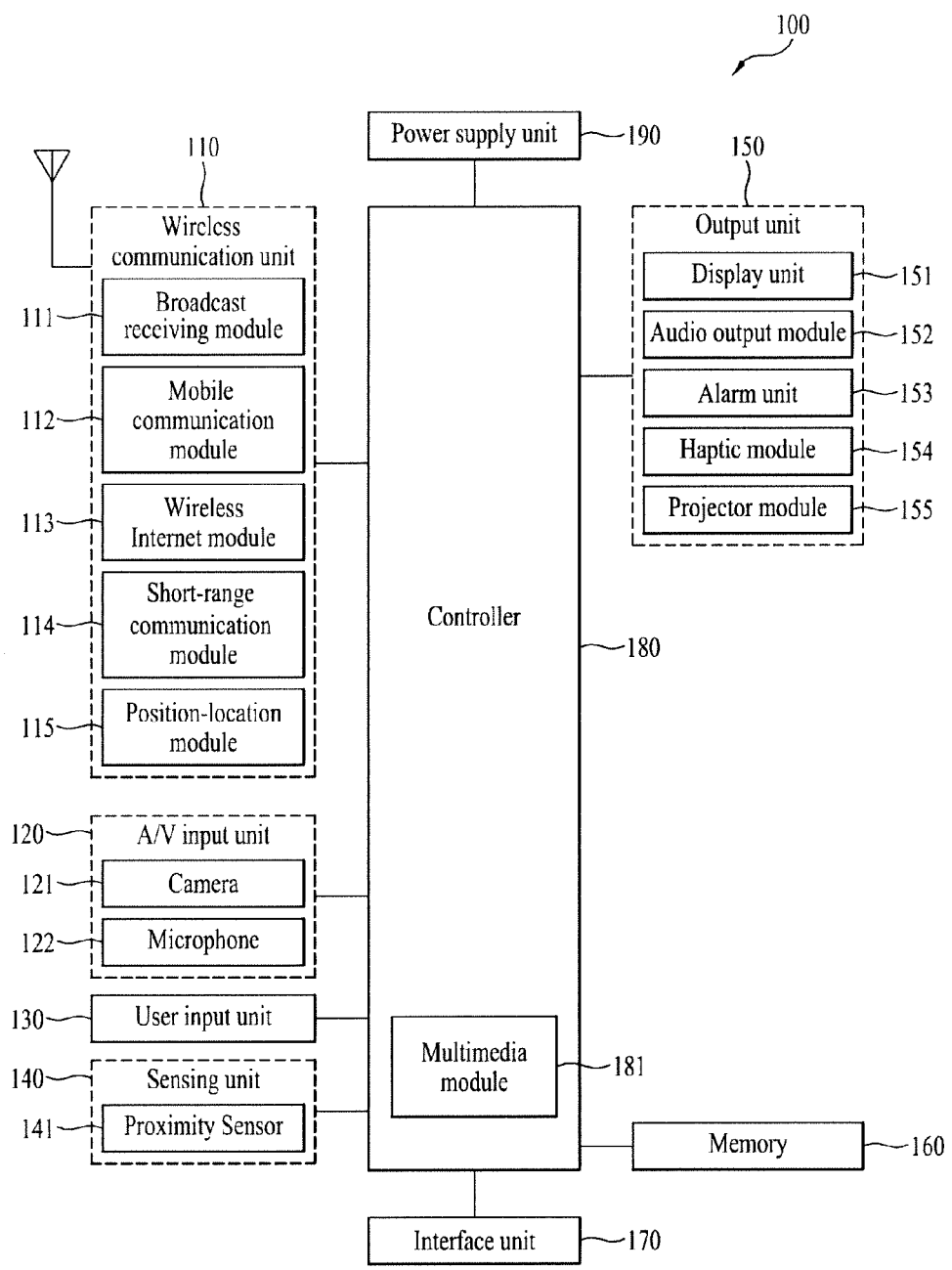
FIG. 1 illustrates a block diagram of a mobile terminal in accordance with one embodiment of the present invention.

FIG. 1 illustrates a block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include information related to a broadcast channel, a broadcast program, or a broadcast service provider. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can include an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the previously described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. The wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi®, Wireless Broadband (WiBro®), World Interoperability for Microwave Access (WiMAX®), or High Speed Downlink Packet Access (HSDPA).

The short-range communication module 114 can be a module for supporting relatively short-range communications. For example, the short-range communication module 114 can be configured to communicate using short range communication technology, such as radio frequency identification (RFID), Infrared Data Association (IrDA), or Ultra-wideband (UWB), as well as networking technologies, such as Bluetooth® or ZigBee®.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can receive and process image frames of still images or video obtained by an image sensor of the camera 121 in a video call mode or a photographing mode. The processed image frames can be displayed on a display unit 151.

The image frames processed by the camera 121 can be stored in the memory 160 or can be transmitted to an external device via the wireless communication unit 110. Other embodiments of the mobile terminal 100 can include more than one camera 121.

The microphone 122 can receive an external audio signal while the mobile terminal 100 is operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply unit 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information associated with the mobile terminal 100.

For example, when the mobile terminal 100 is in a call mode, the display unit 151 can display a user interface (UI) or a graphic user interface (GUI) including information associated with placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be a transparent type or an optical transmissive type, such that the display unit 151 is implemented as a transparent display. For example, the transparent display can include a transparent OLED (TOLED) display. The rear structure of the display unit 151 can also be of an optical transmissive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to identify a touched portion of the display unit 151.

The proximity sensor 141 of the sensing unit 140 can be located in an internal region of the mobile terminal 100 and either be enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor, and the proximity sensor 141 can have greater utility than a contact sensor.

The proximity sensor 141 can include a transmissive photo-electric sensor, a direct reflective photo-electric sensor, a mirror reflective photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will also be herein referred to as a "proximity touch," while an action of bringing the pointer into contact with the touch screen will also be herein referred to as a "contact touch." A proximity touch position of the pointer on the touch screen can correspond to a position on the touch screen from which the pointer is situated perpendicularly with respect to the touch screen.

A proximity touch and a proximity touch pattern can be detected via the proximity sensor 141, such as a proximity touch distance, a proximity touch duration, a proximity touch position, or a proximity touch movement state. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100 using vibration as well as video or audio signals. Events that may be indicated are a call received event, a message received event and a touch input received event. The video or audio signals can also be output via the display unit 151 or the audio output module 152. Therefore, in various embodiments, the display unit 151 or the audio output module 152 can be considered part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, an image producing element (not shown) for producing an image to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of the image producing element used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, the various types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identity module (UIM), a subscriber identity module (SIM) or a universal subscriber identity module (USIM). A device including the identity module (also referred to as an "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 can serve as a conduit to allow power from the cradle to be supplied to the mobile terminal 100, or can serve as a conduit to allow various command signals input by the user via the external cradle to be transmitted to the mobile terminal 100. Various command signals or power provided by the external cradle can be used as signals for recognizing that the mobile terminal 100 is properly loaded in the external cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The controller 180 can include a multimedia module 181 for playing multimedia. The multimedia module 181 can be integrated into the controller 180 as shown in FIG. 1, or can be external to the controller 180.

The power supply unit 190 can be an external power source, an internal power source, or a combination thereof. The power supply unit 190 can supply power to other components in the mobile terminal 100.

Various embodiments described herein can be implemented via a computer-readable medium using, for example, computer software, hardware, or a combination thereof. For example, the components of the mobile terminal 100 described herein can be implemented in hardware using at least application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, and/or combinations thereof. In other embodiments, such components can be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2:
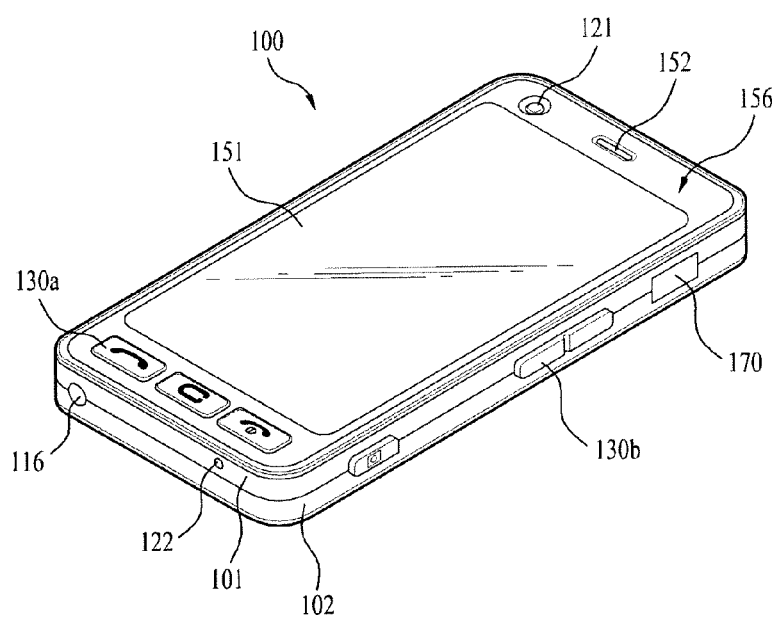
FIG. 2 is a front perspective view of a mobile terminal in accordance with one embodiment of the present invention.

FIG. 2 is a front perspective view of the mobile terminal 100 in accordance with one embodiment of the present invention. In FIG. 2, the mobile terminal 100 is shown to have a bar type terminal body.

It should be understood, however, that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2, for example, the display unit 151 can be configured to occupy a substantial portion of the front face 156 of the front case 101. As also shown in FIG. 2, the audio output unit 152 and the camera 121 can be arranged in proximity to one end of the display unit 151, and the user input module 130a and the microphone 122 can be located in proximity to another end of the display unit 151. As further shown in FIG. 2, the user input module 130b and the interface unit 170 are arranged on the sides of the front case 101 and the rear case 102.

The user input unit 130 described previously with respect to FIG. 1 can be configured to receive a command for controlling an operation of the mobile terminal 100 and can include one or more user input modules 130a and 130b shown in FIG. 2. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured to allow a user to input commands such as "start," "end," and "scroll" to the mobile terminal 100. The user input module 130b can allow a user to input a command for adjusting the volume of the audio output unit 152 or a command for switching to a touch recognition mode of the display unit 151.

Figure 3:
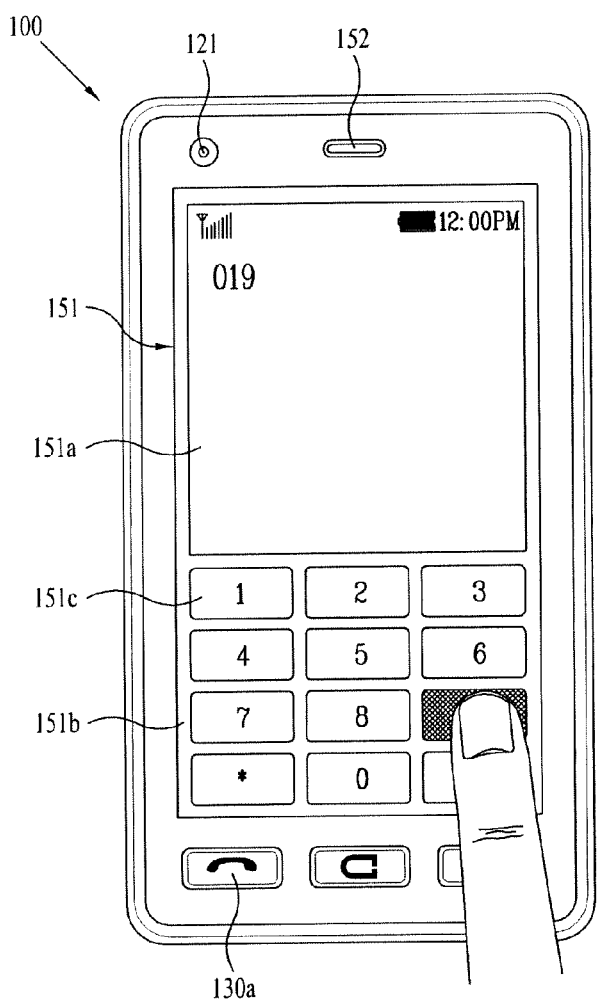
FIG. 3 is a front-view of a mobile terminal according to various embodiments of the present invention.

FIG. 3 is a front-view of mobile terminal 100 according to various embodiments of the present invention. Various kinds of visual information can be displayed on the display unit 151, such as characters, numerals, symbols, graphics, and icons. In order to input information, at least one of the characters, numerals, symbols, graphics and icons are represented as a single predetermined array to be implemented in a keypad formation on the display unit 151. This keypad formation is also referred to as "soft keys."

FIG. 3 shows a touch input applied to a soft key via a front face of a terminal body. The display unit 151 is operable through an entire area of the display unit 151 or by a number of divided regions on the display unit 151. In the latter case, the number of divided regions can be interoperable with each other.

For example, an output window 151a and an input window 151b are displayed on the display unit 151. A soft key 151c representing a digit for inputting a phone number or other data is displayed in the input window 151b. If the soft key 151c is touched, a digit corresponding to the touched soft key is displayed in the output window 151a. If the user input module 130a is manipulated, a call connection for the phone number displayed in the output window 151a is attempted.

Additionally, the display unit 151 may be configured to receive a touch input by scroll. A user scrolls the display unit 151 to shift a cursor or pointer located at an entity, such as an icon, displayed on the display unit 151. When a finger is shifted on the display unit 151, a path of the shifted finger can be visually displayed on the display unit 151. This may be useful when editing an image displayed on the display unit 151.

Various methods will be presented herein in which an interlock function is performed using at last two devices that can communicate with one another. Accordingly, when an interlock function is set or canceled on one device, the other device becomes a key for setting or cancelling the interlock function. For example, in order to set an interlock function on a first device, the first device can request information for the interlock function from a second device. If the second device provides the proper information in response to the request, the second device can set the interlock function on the first device. Alternatively, in order to cancel the interlock function and release the first device from its locked state, the proper information for canceling the interlock function should be provided from the second device.

For clarity and convenience of the following description, consider that the mobile terminal 100 is the device on which the interlock lock function will be set. Further consider that the external device performs a key function for setting the interlock function on the mobile terminal 100. In this case, the external device can be configured to be the same as the mobile terminal 100 or different from the mobile terminal 100. Preferably, the external device includes a control module for performing overall control operations related to the interlock function and a wireless communication module for transceiving information with the mobile terminal 100 related to the interlock function. Moreover, in the following embodiments, consider that the display unit 151 of the mobile terminal 100 is configured as a touch screen and is also herein referred to as a touch screen 151.

An interlock function using position information can be performed in the following manner. The mobile terminal 100 can obtain position information of an external device. The interlock function is set or canceled on the mobile terminal 100 only when the external device is situated within a preset distance from the mobile terminal 100 and/or when a condition with respect to a preset relative position of the mobile terminal 100 is satisfied. The position information of the mobile terminal 100 and the position information of the external device can be obtained from the position location module 115, which can be a GPS device. Accordingly, the external device preferably includes a position location module.

Figure 4:
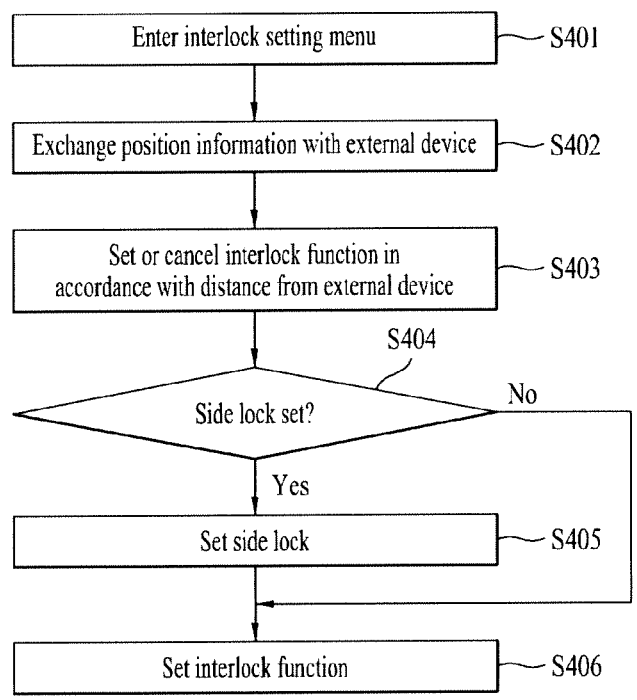
FIG. 4 is a flowchart of a method for performing an interlock function of a mobile terminal in accordance with one embodiment of the present invention.

FIG. 4 is a flowchart of a method for performing an interlock function of the mobile terminal 100 in accordance with one embodiment of the present invention.

With reference to FIG. 4, the controller 180 can enter an interlock setting menu of the mobile terminal 100 in response to a selection of a prescribed icon or a manipulation of a prescribed menu [S401].

The controller 180 can then request position information of an external device [S402]. In one embodiment, the external device can be found by the controller 180. For example, the controller 180 can search for one or more external devices via the wireless communication unit 110 and select the external device from the one or more external devices.

In one embodiment, the controller 180 can request and receive the position information of the external device using short-range communication technology, such as Bluetooth®.

In another embodiment, the controller 180 can request and receive the position information using a 3G or 4G data network communication via a prescribed application or using a message service, such as the Short Message Service (SMS) or the Multimedia Messaging Service (MMS). In yet another embodiment, the controller 180 can receive the position information in GPS data form by using the National Marine Electronics Association (NMEA) communication protocol.

After the position information of the external device has been received, the controller 180 can compare the position of the mobile terminal 100 with the position information of the external device. The controller 180 can then provide an output via the output unit 150 as to whether or not the interlock function can be set based on a user selection if the relative position of the mobile terminal 100 and/or a distance difference value satisfies a preset condition [S403]. In one embodiment, the distance difference value can be the distance between the position of the mobile terminal 100 and the position of the external device.

If the relative position of the mobile terminal 100 and/or the distance difference value satisfies a preset condition, a user can set a side lock function in addition to the interlock function [S404]. In one embodiment, the side lock function can be a geo-lock function for setting or canceling an interlock function according to specific coordinates as well as according to the distance difference value. In another embodiment, the side lock function can be an offset setting function for changing the form of an output on the output unit 150.

If the user sets the side lock function [S404], the controller 180 can set the interlock function of the mobile terminal 100 according to both the side lock function and the distance difference value [S405; S406]. If the user does not set the side lock function [S404], the controller 180 can set the interlock function based on the distance difference value [S406].

When the mobile terminal 100 becomes lost and is moved beyond a preset distance from the external device, the interlock function of the mobile terminal 100 cannot be canceled. Therefore, the mobile terminal 100 can provide a power lock function based on a position of the mobile terminal 100. Moreover, the user can obtain the position information of the mobile terminal 100 using the external device to facilitate location of the mobile terminal 100 when the mobile terminal 100 becomes lost.

FIGS. 5A through 5E are display screens of the touch screen 151 showing a procedure for setting a position based interlock function in the mobile terminal 100 in accordance with one embodiment of the present invention.

Figure 5A:
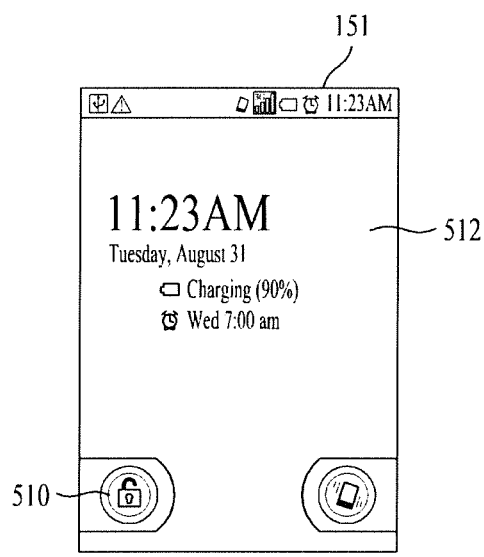
FIGS. 5A through 5E are display screens of a touch screen showing a procedure for setting a position based interlock function in a mobile terminal in accordance with one embodiment of the present invention.
Figure 5B:
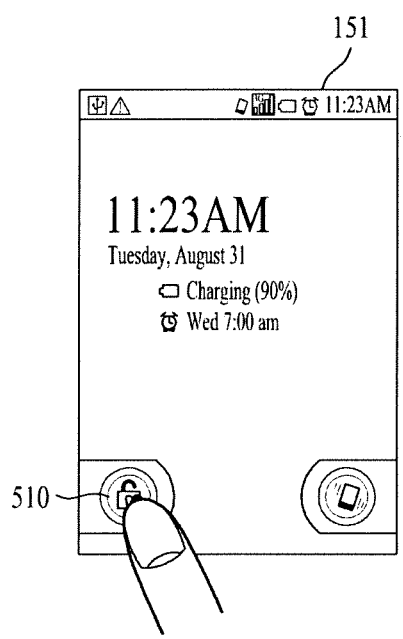
Figure 5C:
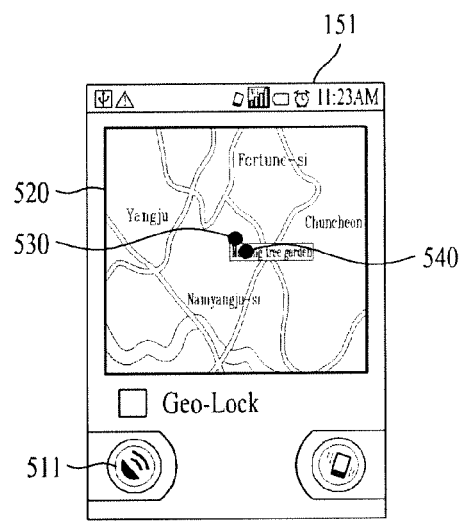

As shown in FIG. 5A, an icon 510 for setting an interlock function is displayed in a standby screen 512 on the touch screen 151. When a user selects the icon 510 as shown in FIG. 5B, a map screen 520 is displayed on the touch screen 151 as shown in FIG. 5C. As further shown in FIG. 5C, a position 530 representing the position of the mobile terminal 100 obtained via the position location module 115, and a position 540 representing the position of an external device are displayed on the map screen 520.

In FIG. 5C, consider that the condition for setting the interlock function requires that a distance between the position of the mobile terminal 100 and the position of the external device be within a single grid on a map. Further consider that the condition for setting the interlock function is satisfied in the configuration shown in FIG. 5C. Accordingly, the icon 510 for setting the interlock function is changed to the icon 511 in order to indicate that the interlock function can be set.

Figure 5D:
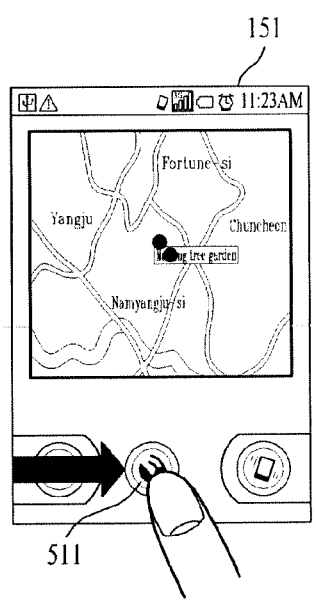
Figure 5E:
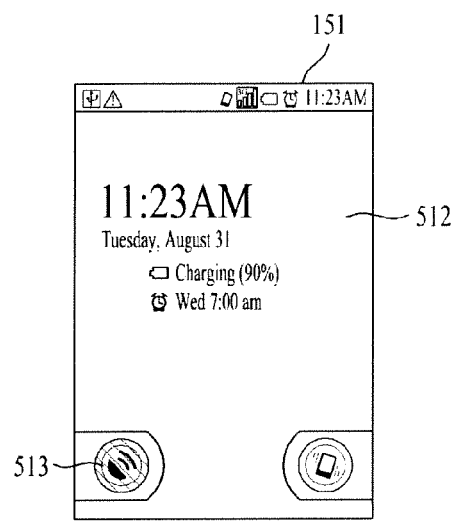

As shown in FIG. 5D, if the user of the mobile terminal 100 drags the icon 511 in one direction, the interlock function can be set. As shown in FIG. 5E, the icon 511 can be changed to the icon 513 to indicate that the interlock function has been set.

It should be understood that the icon 510 for setting the interlock function may be displayed in a display screen other than the standby screen 512. Furthermore, the form of the icon 510 and the method of dragging the icon 510 are merely intended as examples and may be modified in other embodiments.

Figure 6:
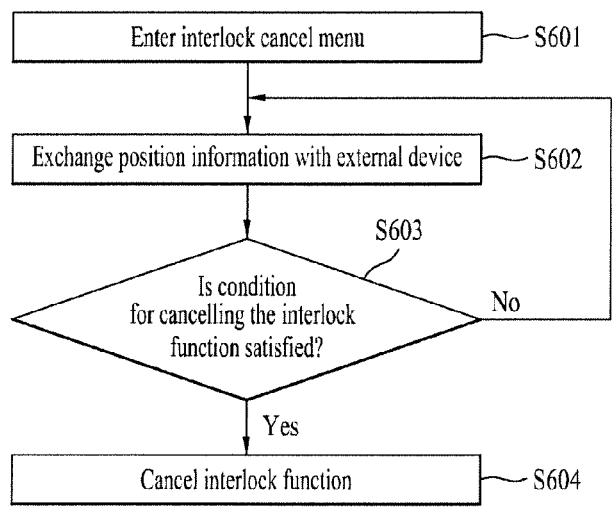
FIG. 6 is a flowchart of a method for canceling an interlock function of a mobile terminal in accordance with one embodiment of the present invention.

FIG. 6 is a flowchart of a method for canceling an interlock function of the mobile terminal 100 in accordance with one embodiment of the present invention.

Referring to FIG. 6, a user can initiate a procedure for canceling an interlock function of the mobile terminal 100 via a prescribed icon or a prescribed menu manipulation [S601]. The controller 180 can then control the wireless communication unit 110 to request position information of an external device [S602].

In one embodiment, the controller 180 can request and receive the position information of the external device using short-range communication technology, such as Bluetooth®. In another embodiment, the controller 180 can request and receive the position information using a 3G or 4G data network communication via a prescribed application or using a message service, such as the Short Message Service (SMS) or the Multimedia Messaging Service (MMS). In yet another embodiment, the controller 180 can receive the position information in GPS data form by using the National Marine Electronics Association (NMEA) communication protocol.

After the position information of the external device has been obtained, the controller 180 compares the position information of the mobile terminal 100 with the position information of the external device. If the distance between the position of the mobile terminal 100 and the position of the external device, that is, the distance difference value, is within a preset range, the controller 180 can then provide an output via the output unit 150 as to whether or not the interlock function can be canceled [S603].

If the interlock function can be canceled, the controller 180 can cancel the interlock function to unlock the mobile terminal 100 in accordance with a selection made by the user [S604].

FIGS. 7A through 7F are display screens showing a method for canceling a position based interlock function of the mobile terminal 100 in accordance with one embodiment of the present invention.

Figure 7A:
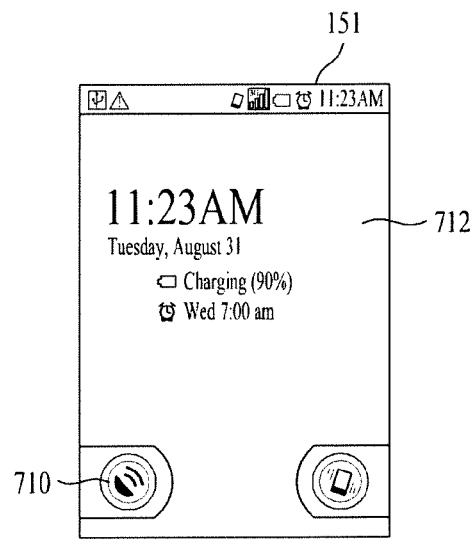
FIGS. 7A through 7F are display screens showing a method for canceling a position based interlock function of a mobile terminal in accordance with one embodiment of the present invention.
Figure 7B:
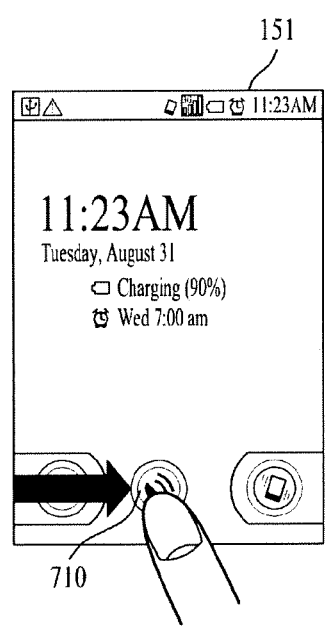
Figure 7C:
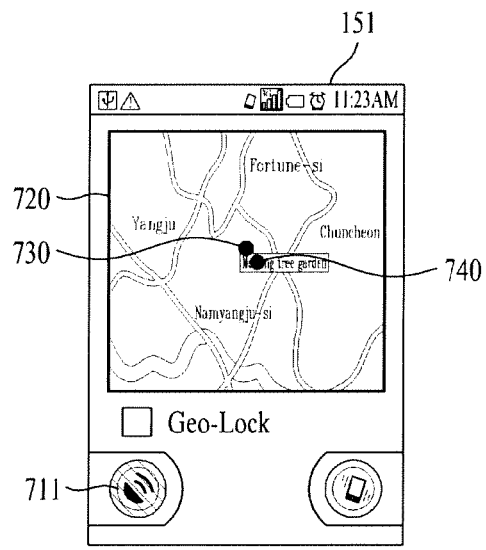

As shown in FIG. 7A, an icon 710 indicating that an interlock function is set is displayed in a standby screen 712 on the touch screen 151. When a user drags the icon 710 in one direction as shown in FIG. 7B, a map screen 720 is displayed on the touch screen 151 as shown in FIG. 7C. As further shown in FIG. 7C, a position 730 of the mobile terminal 100 obtained via the position location module 115 of the mobile terminal 100 and a position 740 of an external device obtained from the external device are displayed on the map screen 720.

In FIG. 7C, consider that the condition for cancelling the interlock function requires that the distance between the position of the mobile terminal 100 and the position of the external device be within a single grid on a map. Further consider that the condition for cancelling the interlock function is satisfied in the configuration shown in FIG. 7C. Accordingly, the icon 710 for setting the interlock function is changed to the icon 711 in order to indicate that the interlock function can be canceled.

Figure 7D:
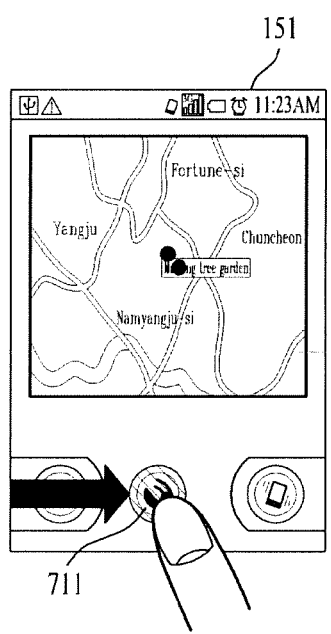
Figure 7E:
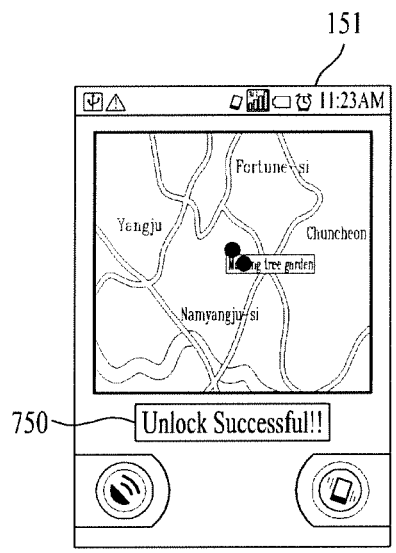
Figure 7F:
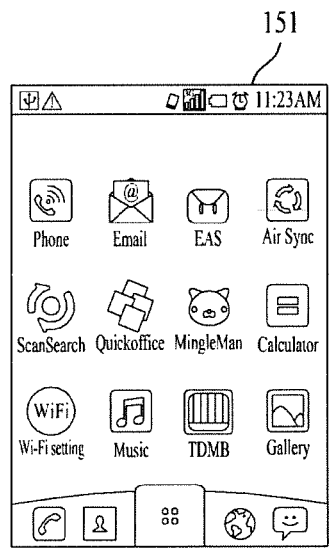

As shown in FIG. 7D, the interlock function can be canceled when the user drags the icon 711 in one direction. As shown in FIG. 7E, a message 750 can be displayed to announce that the interlock function has been successfully canceled. A main menu, wallpaper or a screen last displayed before the interlock function was set can be displayed on the touch screen 151 of the mobile terminal 100.

As previously discussed, the side lock function can be a geo-lock function. FIGS. 8A through 8D are display screens of the touch screen 151 showing a method for setting and canceling a geo-lock function of the mobile terminal 100 in accordance with one embodiment of the present invention. In FIGS. 8A through 8D, consider that a condition for setting or cancelling the interlock function of the mobile terminal 100 is based on the distance between the position of the mobile terminal 100 and the position of the external device. Further consider that the condition is satisfied in FIGS. 8A through 8D.

Figure 8A:
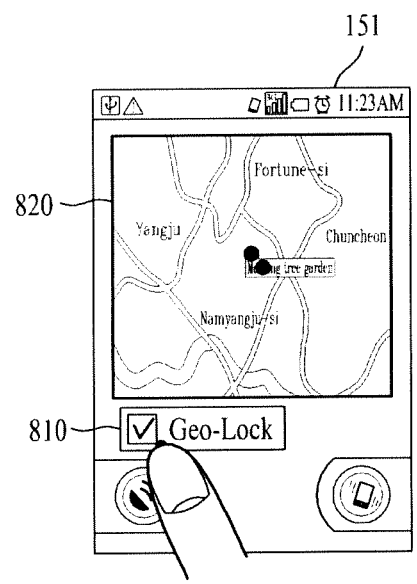
FIGS. 8A through 8D are display screens of a touch screen showing a method for setting and canceling a geo-lock function of a mobile terminal in accordance with one embodiment of the present invention.

It is noted that the configuration shown in FIG. 8A is equivalent to the configuration shown in FIG. 5C. As shown in FIG. 8A, a geo-lock function can be set by selecting a geo-lock icon 810. After the geo-lock icon 810 is set, coordinates of the mobile terminal 100 at a time when the interlock function is set are stored in the memory 160.

Figure 8B:
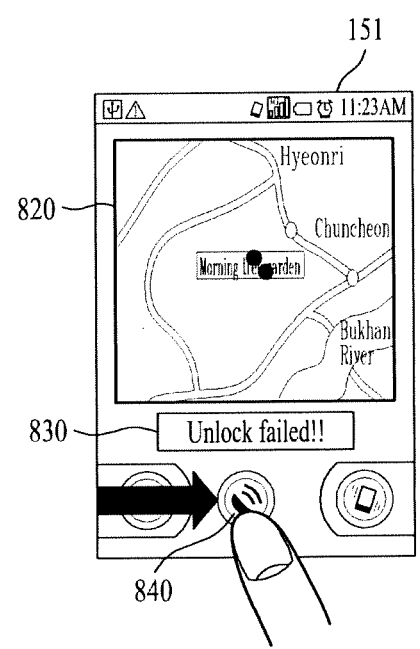

In the embodiment of FIG. 8B, the icon 840 indicates that the interlock function is set. When a user attempts to cancel the interlock function by dragging the icon 840, the controller 180 determines whether a condition based on the distance between the position of the mobile terminal 100 and the position of the external device is satisfied. The controller 180 further determines whether a position of the mobile terminal 100 at the time when the interlock function was set is equal to a current position of the mobile terminal 100 or is within a predetermined range of the current position of the mobile terminal 100.

In FIG. 8B, although the condition based on the distance between the position of the mobile terminal 100 and the position of the external device is satisfied, if the position of the mobile terminal 100 at the time when the interlock function is set is different from the current position of the mobile terminal 100, the controller 180 determines that cancelation of the interlock function is not possible and outputs a failure message 830.

Figure 8C:
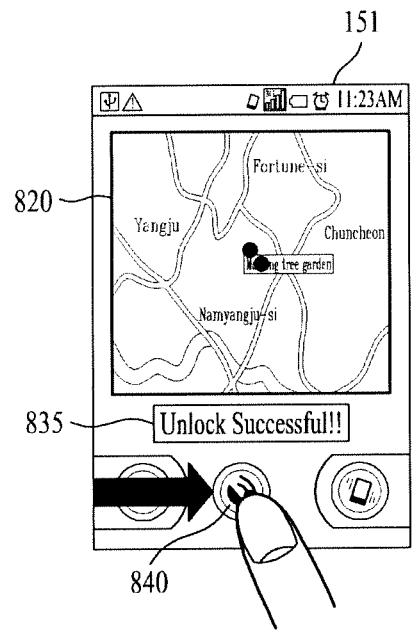
Figure 8D:
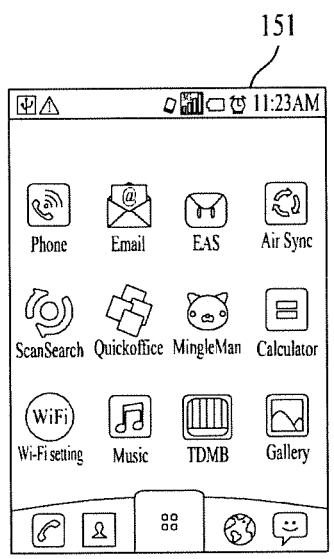

As shown in FIG. 8C, when the position of the mobile terminal 100 at the time when the interlock function is set is equal to the current position of the mobile terminal 100 or within the predetermined range from the current position of the mobile terminal 100, the controller 180 can cancel the interlock function. Accordingly, a success message 835 indicating that the interlock function is successfully canceled can be output on the touch screen 151. As shown in FIG. 8D, a main menu, wallpaper or a screen last displayed before the interlock function was set can be displayed on the touch screen 151 of the mobile terminal 100.

Various embodiments have been described with respect to a predetermined range of distances. Alternatively, a threshold distance can be used.

As previously discussed, the side lock function can be an offset setting function. FIGS. 9A through 9D are display screens of the touch screen 151 showing a method for setting and canceling an offset setting function in accordance with one embodiment of the present invention.

Figure 9A:
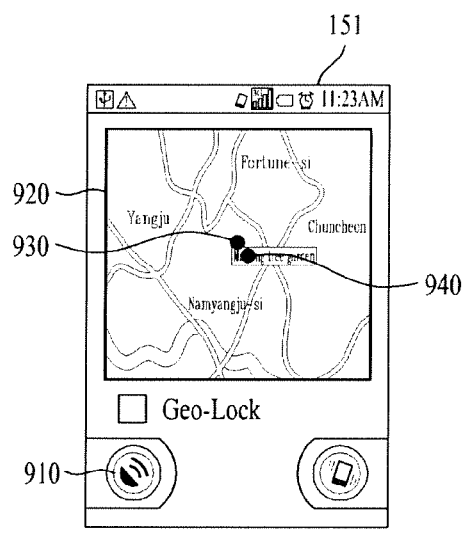
FIGS. 9A through 9F are display screens of a touch screen showing a method for setting and canceling an offset setting function in accordance with one embodiment of the present invention.

It is noted that the configuration shown in FIG. 9A is equivalent to the configuration shown in FIG. 5C. Referring to FIG. 9A, the position 930 of the mobile terminal 100 and the position 940 of an external device are displayed on a map 920.

In FIG. 9A, consider that the condition for setting the interlock function requires that the relative position of the mobile terminal 100 and/or the distance between the position of the mobile terminal 100 and the position of the external device be within a single grid on the map 920. Further consider that the condition for setting the interlock function is satisfied in the configuration shown in FIG. 9A.

Figure 9B:
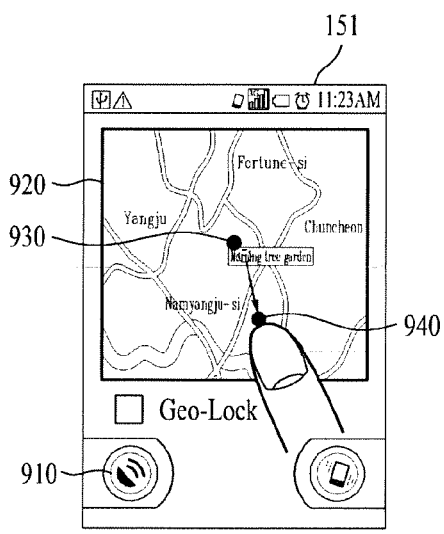

As shown in FIG. 9B, a user can randomly move the position 940 of the external device a random distance to offset the position 940 of the external device. Therefore, the position 940 of the external device as displayed on the touch screen 151 can be changed notwithstanding the actual position of the external device. Therefore, although the mobile terminal 100 and the external device are actually situated within a distance of one grid, the mobile terminal 100 and the external device are displayed on the touch screen 151 as being situated in different grids.

Figure 9C:
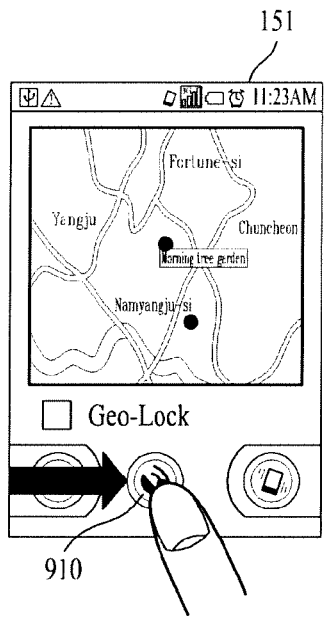
Figure 9D:
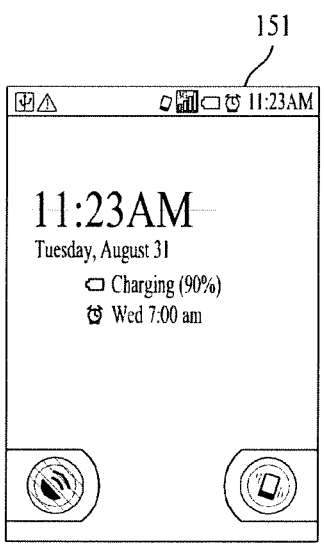

As shown in FIG. 9C, when the user drags the icon 910 for setting the interlock function in one direction, the interlock function is set and a lock screen is displayed on the display unit as shown in FIG. 9D. The value of the offset can be transmitted to the external device when the interlock function is set by the user.

Figure 9E:
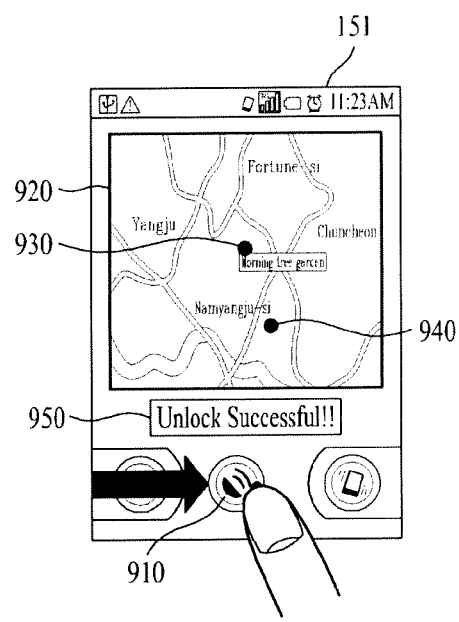

As shown in FIG. 9E, when the user attempts to cancel the interlock function and the distance between the mobile terminal 100 and the external device required by the condition to set the interlock function is met, the value of the offset is applied to the map 920 such that the distance between the position 930 of the mobile terminal 100 and the position 940 of the external device is shown to exceed one grid. However, since the user of the mobile terminal 100 is aware that the position 940 of the external device is displayed subject to the value of the offset, the user is able to cancel the interlock function by dragging the icon 910.

It should be noted that in FIG. 9E, the position 940 of the external device displayed on the map 920 can represent a position resulting from applying the value of the offset to the position information transmitted to the mobile terminal 100 from the external device or represent the position information transmitted from the external device with an applied offset value.

Figure 9F:
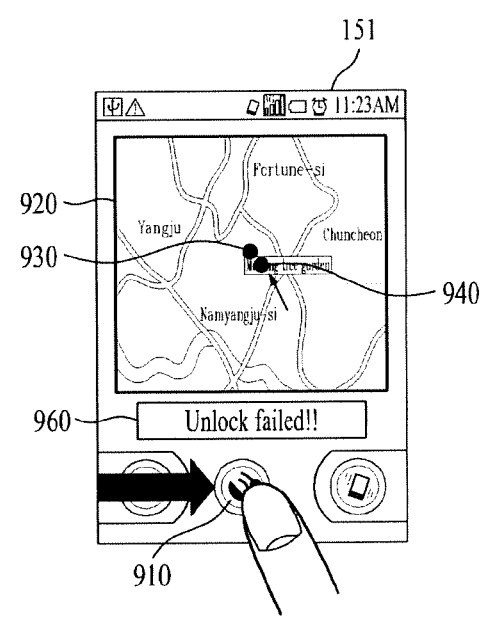

As an alternative to FIG. 9E, when the external device is physically moved such that the distance between the mobile terminal 100 and the external device is within one grid on the map 920, the interlock function cannot be canceled by the user as shown in FIG. 9F.

Figure 10:
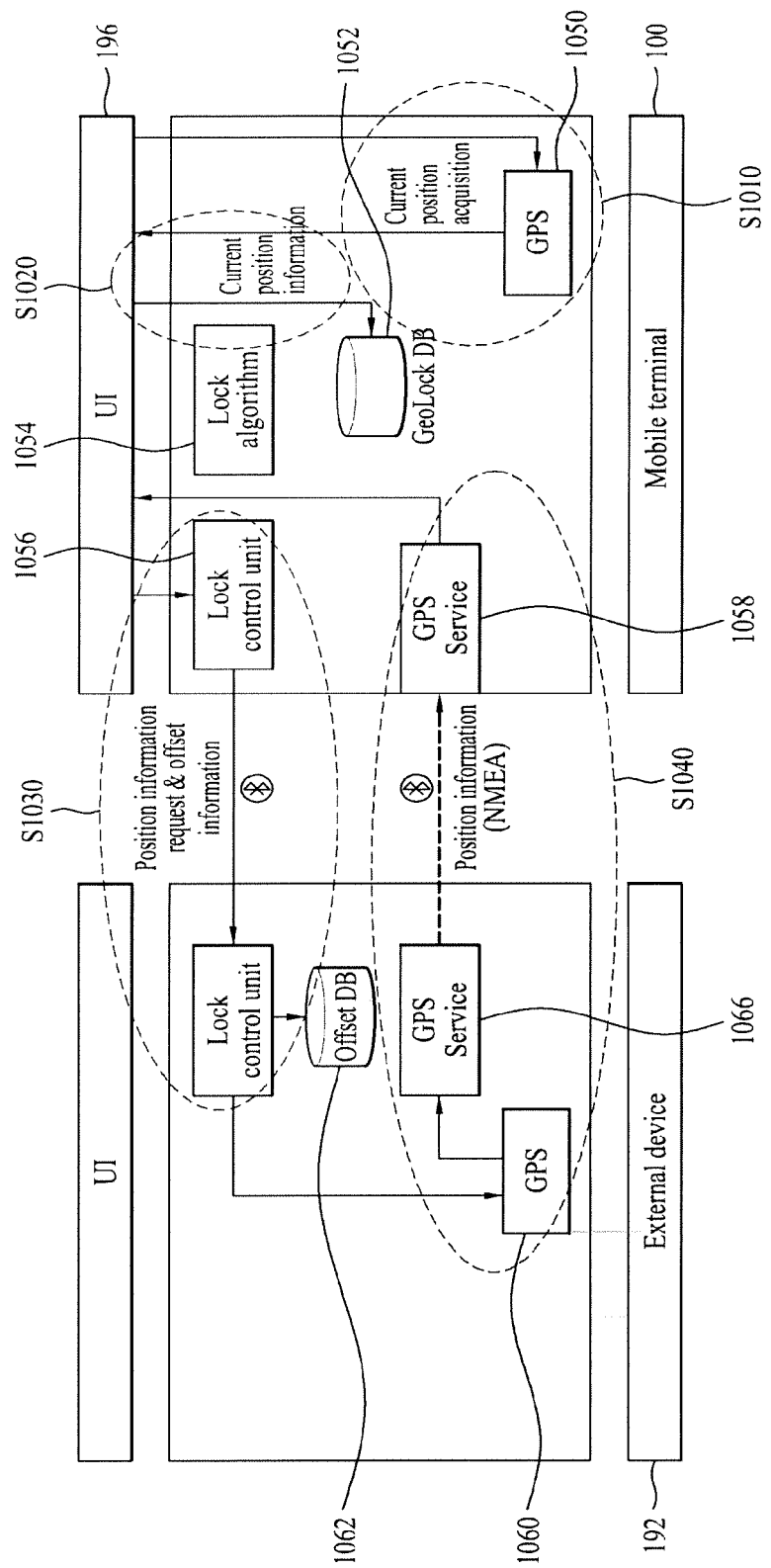
FIG. 10 is a diagram showing an operation for setting an interlock function and a side lock function in a mobile terminal in accordance with one embodiment of the present invention.

FIG. 10 is a diagram showing an operation for setting an interlock function and a side lock function in the mobile terminal 100 in accordance with one embodiment of the present invention.

Referring to FIG. 10, a current position of the mobile terminal 100 is obtained through the position location module (GPS) 1050 when a command for setting an interlock function is input by a user via the user interface (UI) 196 of the mobile terminal 100 [S1010]. In one embodiment, the current position of the mobile terminal 100 is stored in a geo-lock database (hereinafter referred to as "GeoLock DB") 1052 when a user sets a geo-lock function [S1020].

A lock control unit 1056 controls a wireless communication unit 110 to transmit to the external device 192 a request for position information of the external device 192. If offset information set by a user exists, the lock control unit 1056 transmits the offset information together with the request to the external device 192 [S1030].

The external device 192 obtains the position information requested by the mobile terminal 100 from the GPS 1060 and then transmits the obtained position information to the mobile terminal 100 via the GPS service 1066 for controlling the GPS 1060. If the offset information is received from the mobile terminal 100, the received offset information is stored in an offset database (hereinafter referred to as "Offset DB") 1062 of the external device 192.

The GPS service 1058 of the mobile terminal 100 interprets the received position information of the external device 192 and then displays the interpreted position information on the user interface (UI) 196 [S1040].

Figure 11:
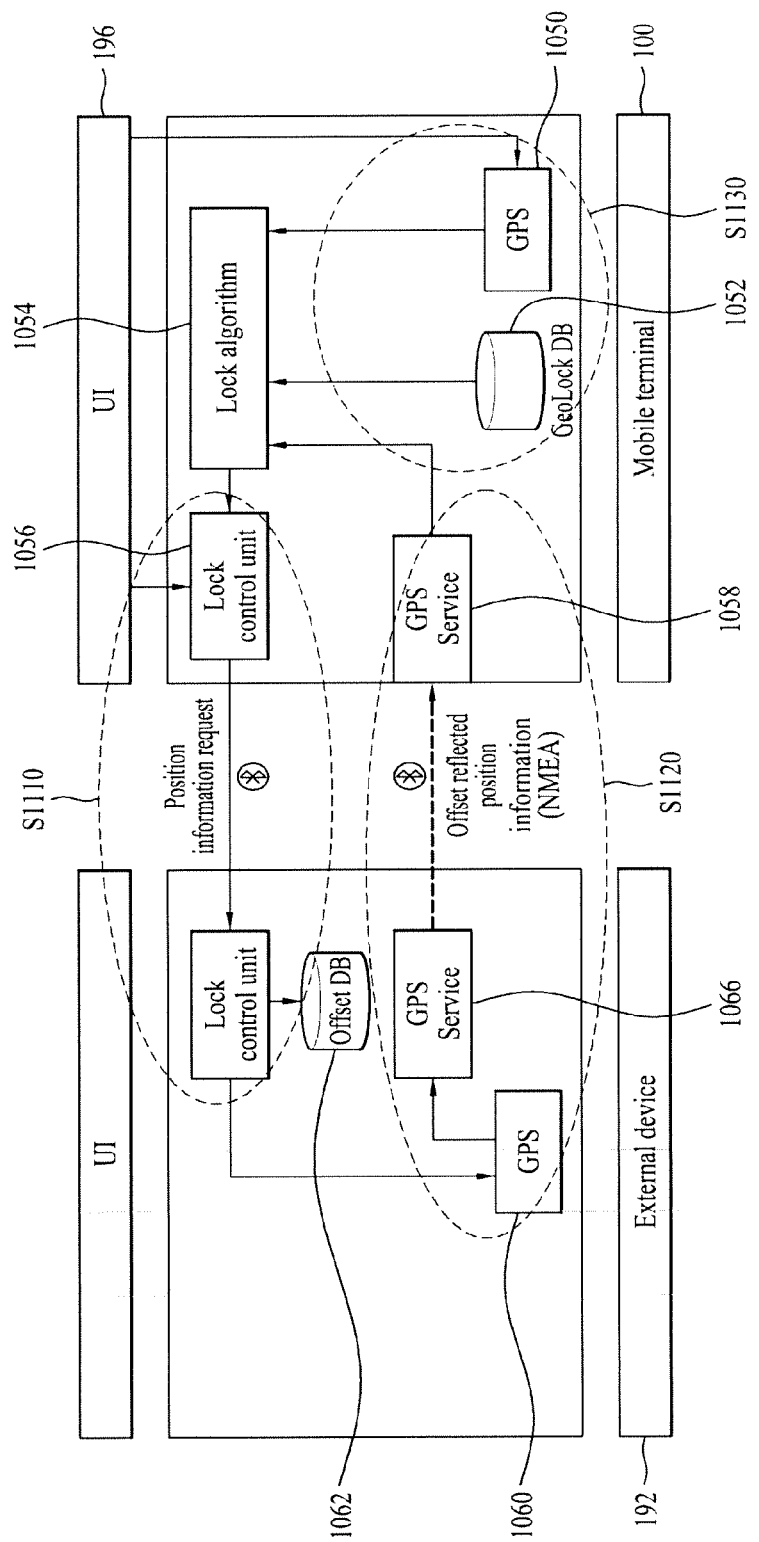
FIG. 11 is a diagram showing an operation for canceling an interlock function and a side lock function in a mobile terminal in accordance with one embodiment of the present invention.

FIG. 11 is a diagram showing an operation for canceling an interlock function and a side lock function in the mobile terminal 100 in accordance with one embodiment of the present invention.

Referring to FIG. 11, the lock control unit 1056 controls the wireless communication unit 110 to transmit a request for the position of the external device 192 to the external device 192 when a command for canceling an interlock function is input by a user via the user interface (UI) 196 [S1110].

After receiving the request from the mobile terminal 100, the external device 192 obtains current position information via the GPS 1060 and then transmits the obtained current position information to the mobile terminal 100. If offset information is provided by the mobile terminal 100 when setting the interlock function, the external device 192 can transmit position information to which the offset information is applied to the mobile terminal 100 [S1120].

The mobile terminal 100 can determine whether to cancel the interlock function via the lock algorithm 1054 using the position information of the external device 192 to which the offset information is applied and the current position information obtained via the GPS 1050. If a geo-lock function is set, the lock algorithm 1054 can use the position of the mobile terminal 100 at the time when the interlock function is set [S1130]. For example, as shown in Table 1, the mobile terminal 100 can use Boolean codes to implement the lock algorithm.

TABLE 1

Boolean Unlock (Location Dev1, Location Dev2)
{
    Location offset; // Offset set by user in Lock setting
    Location geolock; // geolock set position
    Offset ← getOffsetfromDB( ); // Bring offset value set by user
    geoLock ← getLocationfromDB( ); // Bring GeoLock set position
    Dev1.latitude = Dev1.latitude − offset.latitude;
    Dev1.longitude = Dev1. longitude − offset. Longitude ;
        int distance = CalculateDistance (Dev1, Dev2);
        If (geolock is not null)
        {
            int distance = CalculateDistance (Dev2, geolock)
            if (distance > GPSerroorRange)
                return false;
        }
        return true;
}

The GeoLock DB 1052 in FIGS. 10 and 11 can be a separate module or can be included in the memory 160. Moreover, the GPS service 1058, the lock control unit 1056 and the lock algorithm 1054 can be separate modules or can be implemented by the controller 180.

In one embodiment, the distance between the mobile terminal 100 and the external device 192 for setting or canceling the interlock function can be randomly changed by a user. Moreover, as described below, various types of information in addition to position information can be used as a condition for setting or canceling an interlock function.

A method of performing an interlock function of the mobile terminal 100 using a specific operation of an external device will now be described.

Figure 12A:
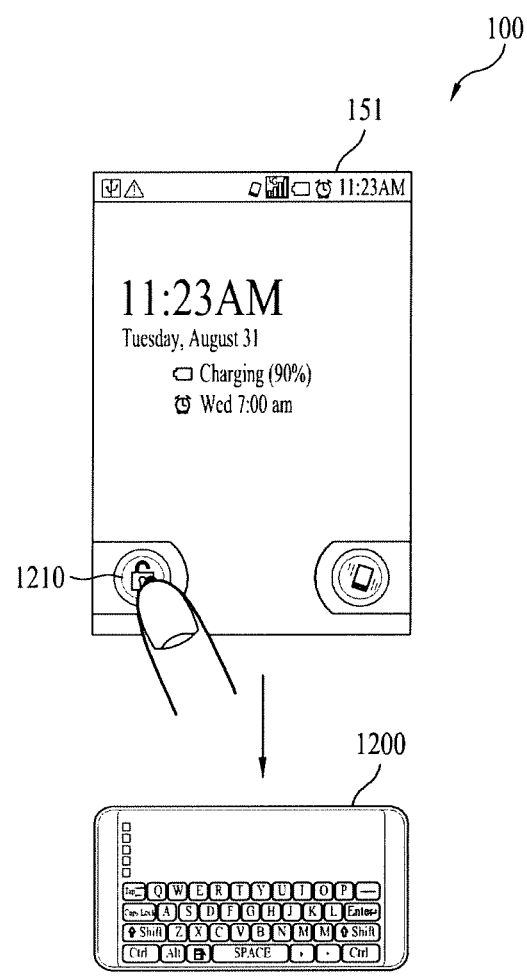
FIGS. 12A through 12C are diagrams showing a method for setting an interlock function of a mobile terminal using a vibration pattern of an external device in accordance with one embodiment of the present invention.
Figure 12B:
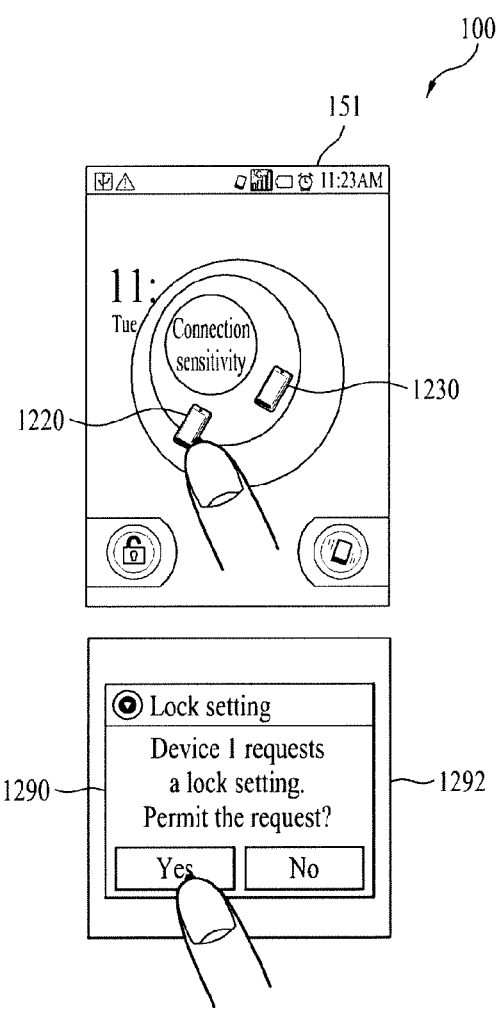
Figure 12C:
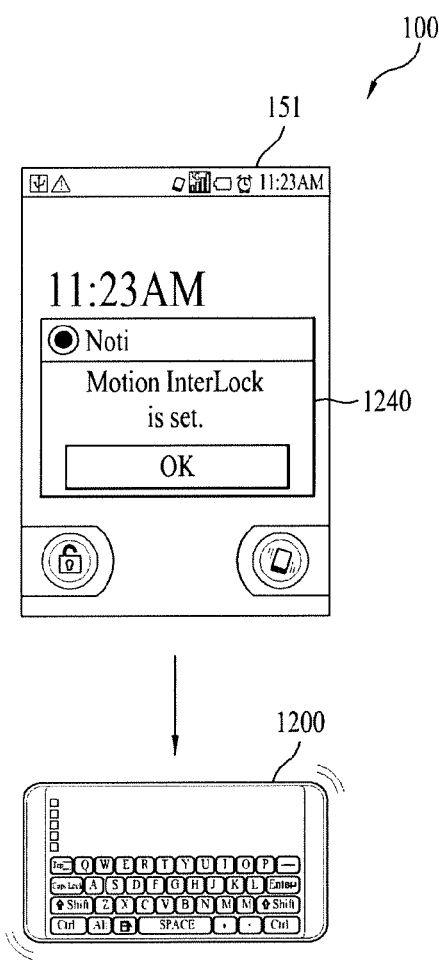

FIGS. 12A through 12C are diagrams showing a method for setting an interlock function of the mobile terminal 100 using a vibration pattern of an external device in accordance with one embodiment of the present invention.

As shown in FIG. 12A, a user can select an interlock function icon 1210 displayed on the touch screen 151 of the mobile terminal 100 to set the interlock function of mobile terminal 100. The mobile terminal 100 can then control the wireless communication unit 110 to search for external devices, such as external device 1200, capable of setting the interlock function of the mobile terminal 100.

As shown in FIG. 12B, the external devices that are found as a result of the search can be displayed as icons 1220 and 1230 on the touch screen 151 of the mobile terminal 100. The mobile terminal 100 can apply various visual effects to the icons 1220 and 1230, such that the visual effects distinguish the icons 1220 and 1230 with respect to a connection sensitivity of each corresponding external device.

As further shown in FIG. 12B, if a user selects the icon 1220 corresponding to a specific external device 1200 among the found external devices, the controller 180 can transmit a request for setting the interlock function to the selected external device 1200. A message 1290 for receiving a selection for granting or denying permission for setting the interlock function can be displayed on a display 1292 of the selected external device 1200.

As shown in FIG. 12C, a vibration of a specific pattern is applied to the selected external device 1200 when the selected external device 1200 grants permission for setting the interlock function. The applied vibration is then transferred as key data of a prescribed format to the mobile terminal 100. A message 1240 indicating that the interlock function has been set via the vibration pattern can be output to the touch screen 151 of the mobile terminal 100. In the embodiment of FIGS. 12A through 12C, it is preferable that the external device 1200 be equipped with an acceleration sensor (e.g., G sensor), a gyro-sensor, and/or another suitable type of sensor to detect vibration, shaking, and/or acceleration applied to the external device 1200.

FIGS. 13A through 13D are diagrams showing a method for cancelling an interlock function using a vibration pattern of an external device in accordance with one embodiment of the present invention.

Figure 13A:
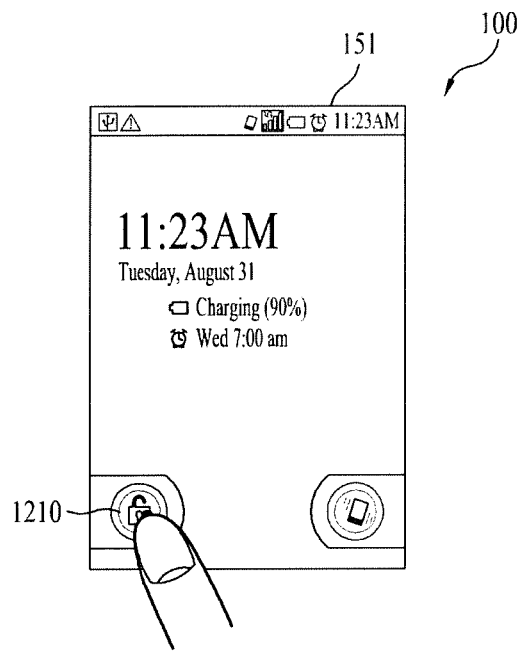
FIGS. 13A through 13D are diagrams showing a method for cancelling an interlock function using a vibration pattern of an external device in accordance with one embodiment of the present invention.

As shown in FIG. 13A, a user can select the interlock function icon 1210 displayed on the touch screen 151 of the mobile terminal 100 to cancel an interlock function set on the mobile terminal 100. The mobile terminal 100 then controls the wireless communication unit 110 to search for external devices, such as external device 1200, capable of canceling the interlock function of the mobile terminal 100.

Figure 13B:
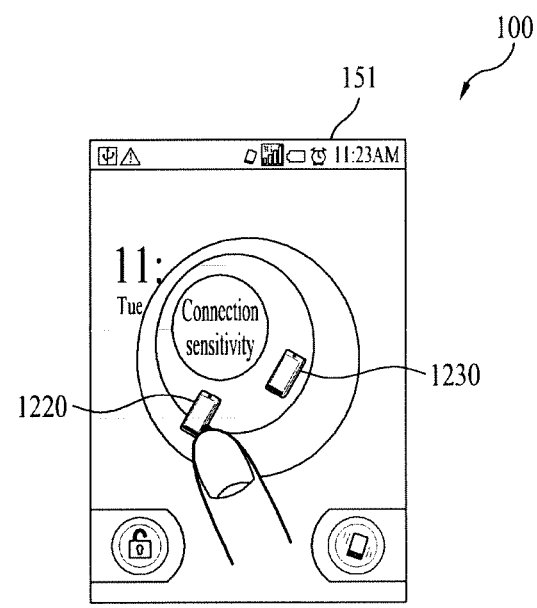

As shown in FIG. 13B, the external devices found as a result of the search can be displayed as icons 1220 and 1230 on the touch screen 151 of the mobile terminal 100. The mobile terminal 100 can apply various visual effects to the icons 1220 and 1230, such that the visual effects distinguish the icons 1220 and 1230 with respect to a connection sensitivity of each corresponding external device.

As further shown in FIG. 13B, if the user selects the icon 1220 corresponding to a specific external device 1200 among the found external devices, the controller 180 can transmit a request to the selected external device 1200 for cancelling the interlock function. The selected external device 1200 can then receive an input of a vibration pattern.

Figure 13C:
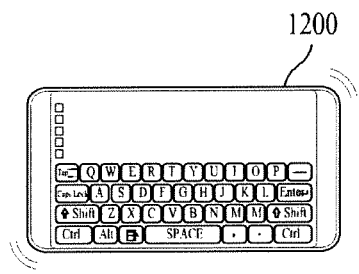

As shown in FIG. 13C, if the vibration pattern is input to the selected external device 1200, the selected external device 1200 converts the vibration pattern to key data of a prescribed format and then transmits the key data to the mobile terminal 100. If the key data received from the selected external device 1200 matches the key data received when the interlock function of the mobile terminal 100 is set, the controller 180 of the mobile terminal 100 cancels the interlock function and, therefore, unlocks the mobile terminal 100.

Figure 13D:
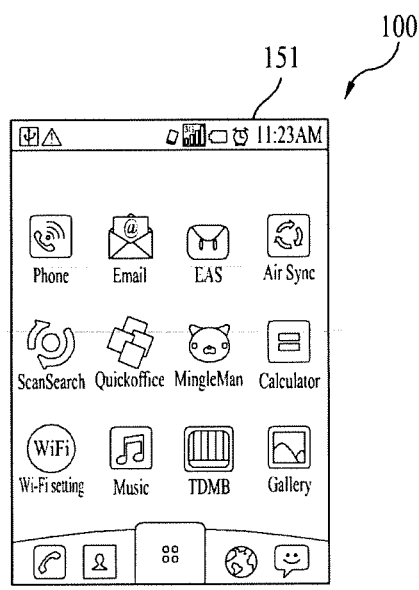

As shown in FIG. 13D, a main menu, a wallpaper or a screen last displayed prior to setting the interlock function can be displayed on the touch screen 151 of the mobile terminal 100.

In other embodiments, information other than a vibration pattern can be input to the external device 1200 for setting or cancelling the interlock function of the mobile terminal 100. For example, an interlock function of the mobile terminal 100 can be set by inputting a password to the external device 1200 that includes characters and/or numerals instead of the vibration pattern. Accordingly, the interlock function of the mobile terminal 100 can be cancelled or unlocked only if a value identical to the password is transmitted by the external device 1200.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The mobile terminal 100 capable of setting and/or cancelling an interlock function using an external device is achieved by a combination of structural elements and features in a predetermined type. Each of the structural elements or features should be considered selectively unless specified separately. Each of the structural elements or features may be carried out without being combined with other structural elements or features. Also, some structural elements and/or features may be combined with one another.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a position location module configured to obtain position information, the position information related to a geographical location of the mobile terminal;
a wireless communication unit configured to permit wireless communication with an external device;
a user input unit configured to receive user input; and
a controller configured to:
receive first position information via the position location module in response to a first command received via the user input unit;
receive second position information via the wireless communication unit, the second position information related to a geographical location of the external device;
identify a relative distance between the mobile terminal and the external device using the first position information and the second position information; and
set an interlock function in response to a second command received via the user input unit,
wherein the interlock function restricts the mobile terminal from performing a function; and
wherein the interlock function is set or canceled when the relative distance between the mobile terminal and the external device is less than a threshold distance and cannot be set or canceled when the relative distance between the mobile terminal and the external device is greater than the threshold distance.

2. The mobile terminal of claim 1, wherein:
the first position information indicates a current position of the mobile terminal when the first command is received; and
the second position information indicates a position of the external device when the first command is received.

3. The mobile terminal of claim 1, further comprising a display, wherein:
the user input unit and the display are configured as a touch screen; and
the first position information and the second position information are displayed on the touch screen such that a first visual effect is displayed for the first position information and a second visual effect is displayed for the second position information.

4. The mobile terminal of claim 3, wherein the controller is further configured to:
control the touch screen to display a first map on a prescribed region of the touch screen when the first command is received, the first map based on the first position information; and
display the first and second visual effects at positions on the first map that correspond to the first and second position information when the first command is received.

5. The mobile terminal of claim 4, wherein the controller is further configured to control the wireless communication unit to transmit an offset value to the external device if a position of the second visual effect on the first map is changed to a position based on the offset value in response to a touch input via the touch screen.

6. A mobile terminal, comprising:
a position location module configured to obtain position information, the position information related to a first geographical location of the mobile terminal;
a wireless communication unit configured to permit wireless communication with an external device;
a user input unit configured to receive user input; and
a controller configured to:
receive first position information via the position location module after an interlock function of the mobile terminal has been set and a first command for canceling the interlock function is received, the interlock function restricting the mobile terminal from performing a function;
receive second position information, the second position information related to a geographical location of an external device;
calculate a first relative distance between the mobile terminal and the external device using the first position information and the second position information; and
cancel the interlock function in response to a second command received via the user input unit,
wherein the interlock function is set or canceled when the calculated first relative distance between the mobile terminal and the external device is less than a first threshold distance and cannot be set or canceled when the calculated first relative distance between the mobile terminal and the external device is greater than the first threshold distance.

7. The mobile terminal of claim 6, wherein:
the first position information indicates a current position of the mobile terminal when the first command is received; and
the second position information indicates a position of the external device when the first command is received.

8. The mobile terminal of claim 7, further comprising a memory configured to store third position information related to a second geographical location of the mobile terminal when the interlock function is set, wherein:
the controller is further configured to:
control the memory to store the third position information when a third command for setting the interlock function is received via the user input unit;
identify a second relative distance between the first and second geographical locations using the first position information and the stored third position information when the third command for setting the interlock function is received; and
cancel the interlock function in response to the second command only if the second relative distance is equal to or less than a second threshold distance.

9. The mobile terminal of claim 7, further comprising a display, wherein:
the user input unit and the display are configured as a touch screen; and
the first position information and the second position information are displayed on the touch screen such that a first visual effect is displayed for the first position information and a second visual effect is displayed for the second position information.

10. The mobile terminal of claim 9, wherein the controller is further configured to control the touch screen to:
display a first map on a prescribed region of the touch screen when the first command is received, the first map based on the first position information; and
display the first and second visual effects at positions on the first map that correspond to the first and second position information when the first command is received.

11. The mobile terminal of claim 10, wherein:
the second position information indicates a geographical location of the external device when the interlock function is set; and
the controller is further configured to control the wireless communication unit to transmit an offset value to the external device when a position of the second visual effect on the first map is changed to a position based on the offset value in response to a touch input on the touch screen.

12. The mobile terminal of claim 6, wherein the second position information relates to a geographical location of the external device determined by applying an offset value to a current position of the external device when a request is made by the mobile terminal via the first command.

13. The mobile terminal of claim 12, wherein the controller is further configured to calculate a second relative distance when the first command is received by comparing the first position information with a value that is generated by subtracting the offset value from the second position information.

14. A method for controlling a mobile terminal, the method comprising:

receiving first position information related to a geographical location of the mobile terminal via a position location module in response to a first command received via a user input unit;
receiving second position information via a wireless communication unit, the second position information related to a geographical location of an external device;
calculating a first relative distance between the mobile terminal and the external device using the first position information and the second position information; and
setting an interlock function in response to a second command received via the user input unit,
wherein the interlock function restricts the mobile terminal from performing a function; and
wherein the interlock function is set or canceled when the calculated first relative distance between the mobile terminal and the external device is less than a threshold distance and cannot be set or canceled when the calculated first relative distance between the mobile terminal and the external device is greater than the threshold distance.

15. A method for controlling a mobile terminal, the method comprising:
setting an interlock function that restricts the mobile terminal from performing a function;
receiving a first command for canceling the interlock function via a user input unit;
receiving first position information related to a first geographical location of the mobile terminal via a position location module;
receiving second position information via a wireless communication unit, the second position information related to a geographical location of the external device;
calculating a first relative distance between the mobile terminal and the external device using the first position information and the second position information; and
canceling the interlock function in response to a second command received via the user input unit,
wherein the interlock function is set or canceled when the calculated first relative distance between the mobile terminal and the external device is less than a threshold distance and cannot be set or canceled when the calculated first relative distance between the mobile terminal and the external device is greater than the threshold distance.

16. The method of claim 15, further comprising storing third position information in a memory, the third position information related to a second geographical location of the mobile terminal when the interlock function is set,
wherein canceling the interlock function is performed only after receiving a third command and when a second relative distance between the first and second geographical locations is equal to or less than a second threshold distance.

17. The method of claim 15, further comprising displaying the first position information and the second position information on a touch screen comprising the user input unit such that a first visual effect is displayed for the first position information and a second visual effect is displayed for the second position information.

18. A mobile terminal, comprising:
a touch screen configured to display information and to receive touch inputs;
a position location module configured to receive position information related to a geographical location of the mobile terminal;

a wireless communication unit configured to permit wireless communication with an external device; and a controller configured to:
control the touch screen to display an icon for setting or canceling an interlock function, the interlock function restricting the mobile terminal from performing a function;
detect receipt of a touch input to the displayed icon;
receive first position information via the position location module in response to a first command input received via the touch screen;
receive second position information via the wireless communication unit, the second position information related to a geographical location of the external device;
control the touch screen to display at least the first position information or the second position information; and
set or cancel the interlock function in response to a second command received via the touch screen,
wherein the interlock function is set or canceled when the relative distance between the mobile terminal and the external device is less than a threshold distance and cannot be set or canceled when the relative distance between the mobile terminal and the external device is greater than the first threshold distance.

19. The mobile terminal of claim 18, wherein the touch input comprises a touch and drag input.

20. The mobile terminal of claim 18, wherein at least the first position information or the second position information are displayed on a map image.

21. A method for controlling a mobile terminal, the method comprising:
displaying an icon on a touch screen for setting or canceling an interlock function, the interlock function restricting the mobile terminal from performing a function;
receiving a touch input on the displayed icon;
receiving first position information via a position location module in response to a first command received via the touch screen;
receiving second position information via a wireless communication unit, the second position information related to a geographical location of an external device;
displaying at least the first position information or the second position information via the touch screen; and
setting or canceling the interlock function in response to a second command received via the touch screen if a relative distance between the mobile terminal and the external device is less than a threshold distance,
wherein the interlock function is set or canceled when the relative distance between the mobile terminal and the external device is less than the threshold distance and cannot be set or canceled when the relative distance between the mobile terminal and the external device is greater than the threshold distance.

22. The method of claim 21, wherein the touch input comprises a touch and drag input.

23. The method of claim 21, wherein at least the first position information or the second position information are displayed on a map image.

* * * * *